INVENTOR.
STERLING W. ALDERFER
BY Hamilton, Cook, Renner & Kenner
ATTORNEYS

INVENTOR.
STERLING W. ALDERFER
BY Hamilton, Cook, Renner & Kenner
ATTORNEYS

INVENTOR.
STERLING W. ALDERFER
BY Hamilton, Cook, Renner & Kenner
ATTORNEYS

INVENTOR.
STERLING W. ALDERFER
BY Hamilton, Cook, Renner & Kenner
ATTORNEYS

INVENTOR.
STERLING W. ALDERFER
BY Hamilton, Cook, Renner & Kenner
ATTORNEYS

INVENTOR.
STERLING W. ALDERFER
BY Hamilton, Cook,
Renner & Kenner
ATTORNEYS

INVENTOR.
STERLING W. ALDERFER
BY Hamilton, Cook, Renner & Kenner
ATTORNEYS

Dec. 11, 1973 S. W. ALDERFER 3,778,329

REINFORCED TIRE FABRIC OF HELICALLY FORMED, LATERALLY SPACED, SINGLE FILAMENT WIRES

Original Filed Jan. 6, 1970

8 Sheets-Sheet 8

INVENTOR.
STERLING W. ALDERFER
BY Hamilton, Cook, Renner & Kenner
ATTORNEYS

United States Patent Office 3,778,329
Patented Dec. 11, 1973

3,778,329
REINFORCED TIRE FABRIC OF HELICALLY FORMED, LATERALLY SPACED, SINGLE FILAMENT WIRES

Sterling W. Alderfer, Akron, Ohio, assignor to The Steelastic Company, Akron, Ohio Original application Jan. 6, 1970, Ser. No. 858, now Patent No. 3,682,222. Divided and this application Apr. 22, 1971, Ser. No. 136,479
Int. Cl. B29h *17/28;* B60c *9/16*
U.S. Cl. 161—47 6 Claims

ABSTRACT OF THE DISCLOSURE

A reinforced tire fabric comprising an elastomeric body portion in which a plurality of helically formed, single filament wires constitute the reinforcing. The helix delineated by each reinforcing wire has a relatively long lay and the diameter thereof is preferably no greater than three times the diameter of the wire itself. The wire filaments may be cold formed into their respective helices by being drawn through relatively rotatable orifice means—adjacent filaments preferably being opposite hand—and encapsulated into a continuously extruded ribbon that is manipulated and appropriately severed to form the fabric. The ribbon may be wound into an annulus that is subsequently slit into a ply strip, or successive lengths of the ribbon may be joined into a ply strip. By either approach the bias of the reinforcing filaments in the finished tire may be preselected.

RELATED APPLICATIONS

This application is a divisional application of my prior copending application, Ser. No. 858, filed Jan. 6, 1970.

BACKGROUND OF THE INVENTION

Prior to the early 1940's the reinforcing cord material used in pneumatic tire fabric was primarily cotton. During the early '40's rayon became the first synthetic fiber to be used as a reinforcing cord only to be subsequently challenged (1950–1960) by nylon which has a higher strength-to-weight ratio. Polyester, though also discovered in the 1940's, did not enter the tire cord market until the early '60's, but major attempts are presently being made to establish it as a tire reinforcing material.

The most recent entrant in the tire fabric reinforcing field has been glass fiber, and its does afford many of the physical properties which are not provided by the aforementioned reinforcing materials but which are uniformly agreed to be the most desirable characteristics for a reinforcing material to be used with mechanical rubber products such as tires—to wit: high tensile strength, low elongation, dimensional stability, high temperature resistance and absence of thermal shrinkage. Although glass fibers would thus appear to be the dream reinforcement for tire fabric, a number of negative characteristics have impeded its full acceptance.

Some of the major drawbacks in using glass fiber as a reinforcing material have been overcome only recently, but other remain. Abrasion resistance, and thus flex life, as well as an increase in rubber-to-glass fiber adhesion have been greatly improved in recent years to overcome two of the major drawbacks, but the fact that glass fibers have extremly low resistance to compressive stresses and the fact that the yield point of glass is uncomfortably close to its ultimate strength still stand as detractants to the acceptance of glass fibers as the ultimate reinforcing material.

The only material that posses all the above-noted physical properties comprising the basic requirements for rubber reinforcing material and is neither beleaguered by compressive stresses nor has a yield point uncomfortably close to its ultimate strength is steel wire. Moreover, steel wire has been used in conjunction with rubber in tires since the later 1800's as a bead reinforcing material so that wire-to-rubber bonding techniques are exceptionally well developed. However, it has long been deemed necessary to weave, or cable, multiple wire filaments into strands, or cords, in order to achieve even minimally acceptable flexibility of the fabric reinforced thereby without fatiguing the wire through constant bending The cabling of the wire into a reinforcing cord has also been deemed necessary to permit the controlled degree of elastic elongation desirable to avoid straining the wire beyond its elastic limit as the tire in which it is incorporated engages irregularities in the roadway over which it travels.

However, the cabling of wire to make a reinforcing cord for tire fabric adds an inordinate cost to the use of steel wire reinforcing in tire fabric and has, at least to some degree, diminished the measure of flexibility associated with comfortable ride characteristics. In an effort to alleviate this expense and soften the ride at least one attempt has been made to employ a single wire strand within a circumferential breaker belt interposed between the carcass and the tread. That wire was oriented substantially circumferentially of the tire and was crimped to provide sinuous undulations along the length thereof so as to be capabble of at least partially straightening out to provide an increase in the circumferential dimension of the belt during shaping and curing of the tire, and, if desired, a further modicum of elasticity to the cured tire without cabling.

However, if the wire is completely straightened, the elastic limit may be too easily exceeded, and if the wire is not completely straightened, repeatedly extending the circumferential dimension of the wire by flexure of undulations results in repeated bending stresses that tend to fatigue the wire and induce premature failure.

In the aforesaid attempt to utilize noncabled wire a continuous, single filament of the crimped wire was wound circumferentially about the tire carcass before the application of tread stock and in such a manner that: the undulation sof each convolution were parallel to those of adjacent convolutions; the adjacent convolutions were in contact with one another; and, the undulations, at any given point along any given convolution, lay in a plane oriented tangentially to the convolution. By thus winding a continuous filament through a plurality of convolutions about the tire carcass the general lay of the wire is disposed substantially parallel—but at no more than a small angle—to a radial reference plane perpendicular to the rotational axis of the tire.

Other than this one unsuccessful attempt to reinforce a tire with a single continuous filament wound directly onto the carcass, when wire has heretofore been used as a reinforcement for tire fabric, the wire was almost universally first cabled and than a plurality of the cabled strands were embedded within rubber stock, as by calendering, to form the fabric.

Calendering has been the historic way in which to make tire fabric, but calendering requires expensive equipment and highly skilled operators to make the sheets of fabric, particularly in widths sufficient to provide a biased orientation of the cabled wire within the finished tire.

When fabric is calendered the reinforcing cords are oriented parallel to the length of the fabric emanating from the calender. As such, in order for the reinforcing cords to be angularly inclined with respect to a circumferential reference plane when the fabric is incorporated in a tire, it is necessary to cut the fabric on the bias. Bias cutting, particularly when the angle desired demands a long cut, is a difficult process requiring expensive machinery.

Not only the "belted/bias-ply" tires but also the "radial" tires utilize a substantially inextensible breaker ply—or belt—between the carcass and the tread. However, because of the substantial inextensibility of such breaker plies, it has heretofore been deemed impractical to apply the breaker plies before the tire has been shaped. This, too, has added considerably to the cost of producing tires with substantially inextensible breaker plies.

SUMMARY OF THE INVENTION

It is, therefore, a primary object of the present invention to provide a tire fabric reinforced by a plurality of single filament wires that will possess the desired flexibility without premature fatigue failure and will, when incorporated in a cured tire, permit sufficient elastic elongation under peak loading so as not to exceed the elastic limit of the wire and yet be substantially inextensible.

It is another object of the present invention to provide wire reinforced tire fabric, as above, that will selectively permit a sufficient extensibility prior cure to allow application as a breaker ply before the tire is shaped.

It is yet another object of the present invention to provide a method for producing wire reinforced tire fabric, as above, whereby calendering can be eliminated.

It is a further object of the present invention to provide a method for producing wire reinforced tire fabric, as above, in a form that can be incorporated in a tire as a ply in which the bias of the reinforcing wires therein can be preselected without waste.

It is a still further object of the present invention to provide an apparatus for making wire reinforced tire fabric, as above.

It is an even further object of the present invention to provide an apparatus for forming wire into fabric reinforcing filaments the helical path of which possesses uniformly precise diameter and lead.

It is an additional object of the present invention to provide a tire in which one or more plies extend circumferentially of the tire, said plies containing a plurality of single filament reinforcing wires, each said filament delineating a cylindrical helix within the corresponding fabric ply, the helix preferably having between one and one-half and three leads per inch and a diameter no greater than three times the diameter of the filament itself so that only approximately one-half to one and one-half percent elongation thereof will result under normal loading and yet seven and one-half percent elongation will be available before failure. As such, up to five percent elongation can be provided under peak loading without exceeding the elastic limit.

These and other objects, together with the advantages thereof over existing and prior art forms, which will become apparent from the following specification are accomplished by means hereinafter described and claimed.

In general, a tire fabric embodying the concept of the present invention comprises an elastomeric body that is reinforced by a plurality of single filament wires, the course of each wire delineating a cylindrically helical path through the body. The helix thus developed is preferably of relatively long pitch with respect to the diameter of the filament and the diameter of the helix is preferably no greater than three times the diameter of the filament.

One or more layers, or plies, of this fabric, may be incorporated into a tire to form the carcass and/or a belt (also referred to as a breaker ply in the art) extending circumferentially of the tire. In either event the wire filaments may be oriented at a selected bias. However, it is preferred that they be biased at least 4° with respect to a circumferential frame of reference.

In order to assure stabilization of the subject fabric that could be jeoparidized by energy stored within the reinforcing filaments, it is highly desirable that successive filaments follow helical paths of opposite hand. Similarly, the directional stability in the tire is augmented if at least two superimposed plies are employed, the filaments in the two plies being inclined to opposite sides of a common circumferential frame of reference.

According to one preferred method for making such a ply a ribbon of uncured elastomeric compound is extruded to include one or more of the helical, wire, reinforcing filaments embedded therein. Successive wraps of this ribbon are contiguously wound onto a fabric forming drum to produce an annulus of predetermined dimensions. The annulus is then helically slit to form the ply fabric, the helix angle of the slit being determinative of the bias angle at which the wire reinforcing filaments will be oriented when the fabric is incorporated as a ply in a tire. This method is accomplished with facility by feeding the reinforcing filaments into an extruder head so that the ribbon emitting therefrom will have the reinforcing filaments embedded therein. The ribbon leads to a drum that is rotated to wind the ribbon thereon, and a stitching means may be employed to join the continuous wraps of the ribbon into the annulus of predetermined dimension.

Subsequent to the formation of the annulus a cutting means cooperates with the drum to slit the annulus along a helical path, the lead angle of the helical path along which the annulus is slit determining the ultimate bias of the reinforcing filaments.

According to another preferred method a strip of the ribbon in which the reinforcing wires are encapsulated is extruded to pass through an accumulator and then onto a receiving means above a table means. When a predetermined length is deposited thereon that strip is severed from the ribbon, deposited on the table means and the table means is indexed to receive a successive strip. After the same length of this next strip is received on the receiving means it too is severed from the ribbon and deposited on the table means and in contact with the previous strip so that they may be stitched together. A succession of such strips, so stitched, forms a ply strip that can be hooped into a continuous belt without waste. Moreover, by adjusting the angular orientation of the table means, and the means by which the ribbon is severed, transversely with respect to the direction in which the ribbon is deposited thereon one can select the degree to which the reinforcing filaments are biased in the resulting belt.

Irrespective of the method by which the fabric is made, to reduce internal stresses within the filaments, the wire is preferably worked rather than coiled to form the helical configuration. It has been found that the wire can be almost completely relieved of internal stresses and helically formed by passing the wire through first and second laterally and longitudinally spaced orifice means while the first orifice means is rotated about the axis of the second orifice means.

The extensibility necessary to permit wire reinforced fabric embodying the concept of the present invention to be applied as a breaker ply before the tire is shaped may be achieved either by forming the filament with a helix lead and diameter sufficient to provide a predetermined extensibility to the filament or by applying the breaker as a plurality of narrow bands in which the filaments are biased so that the body of the fabric, before curing, can stretch between the filaments to accommodate the tire shaping operation.

One preferred embodiment, and an alternative, interim form of a wire reinforced tire fabric embodying the concept of the present invention, and one preferred embodiment of the apparatus by which such a reinforcing filament may be made are shown by way of example in the accompanying drawings and are described in detail, along with two methods and apparatus by which such a fabric may be made, without attempting to show all of the various forms and modifications in which the invention might be embodied; the invention being measured by the appended claims and not by the details of the specification.

DESCRIPTION OF THE PREFERRED EMBODIMENT

Referring more particularly to the drawings, and specifically FIGS. 1 through 4, a fabric embodying the concept of the present invention is designated generally by the numeral 10 and is incorporated within a tire 11 as the two, belts, or breaker plies, 12 and 13. A tread portion T, in which the tread design grooves G are patterned, circumscribes the tire and forms the radially outermost component thereof.

Figure 3:
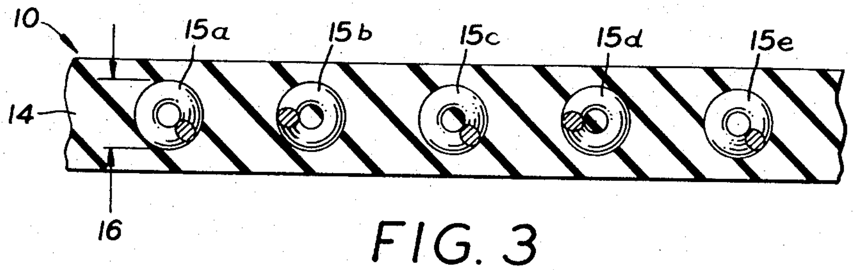
FIG. 3 is an enlarged cross section taken substantially on line 3—3 of FIG. 2 and depicting the successive filaments delineating helices of opposite hand, the diameter of the helices being no greater than three times the diameter of the filaments themselves.
Figure 4:
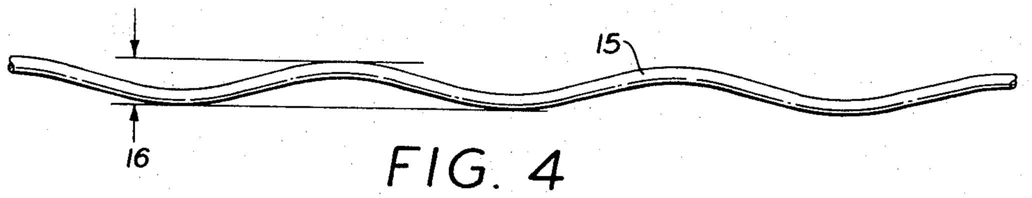
FIG. 4 is a side elevation of a wire reinforcing filament as employed in the fabric depicted in FIG. 2 but somewhat enlarged with respect thereto and disclosing the long lead relative to the diameter of the wire.

The fabric 10 has an elastomeric body 14 in which a plurality of single wire filaments 15 are embedded. Each filament 15 delineates a cylindrical helix the diameter of which is preferably no greater than three times the diameter of the filament. As best seen in FIG. 3, the diameter 16 of the helix traced by the filament is preferably not greater than three times the wire itself so that should the diameter of the wire filament, for example, be on the order of 0.016″ the diameter 16 of the helix should not exceed 0.048″.

The standard practice to determine the individual loading on each filament is to consider the individual loading to be proportionate to the total number of filaments employed, and, to continue the example of the 0.016″ filament, a ten pound per filament loading would be considered normal. Under such a loading about a one to one and one-half percent elongation of the filament is desirable to provide the tire with sufficient flexure and elongation to accommodate localized stresses normally encountered by a tire and may be achieved by the helical configuration of each filament without even approaching the elastic limit of the wire. Although an elongation of approximately that amount is available with glass fibers, a loading that induces any further elongation stresses glass fibers to the breaking point. The filaments 15, however, can elongate approximately seven and one-half percent before failing and approximately five percent without exceeding the elastic limit because the helical configuration of the wire augments the elongation available from the steel itself.

Also of considerable importance is the fact that the helical configuration changes the nature of the stress within the wire itself when the fabric is subjected to repeated applications of tensile, compressive or flexural stresses. When the reinforcing comprises a straight wire, or a straight length of glass fiber, all the stresses imposed thereon are of the same nature as those applied to the fabric, and with a crimped wire the stresses are largely bending stresses irrespective of whether the stress applied to the fabric is tensile, compressive or flexural. However, when the reinforcing wire delineates a cylindrical helix the stress on any cross section of the wire is largely a shearing stress and of the shearing stress the greater part is a torsional stress. Accordingly, because of the configuration of the filament itself, the stresses to which it is subjected can be advantageously accepted to reduce premature failure as a result of fatigue or momentary peak loadings. To accomplish this result the use of a material having a high shearing strength—such as high carbon steel—is suggested for the filament.

In order to assure satisfactory wire-to-body adhesion when the elastomeric body of the fabric is rubber, the filament may be provided with a finish compatible with the amount of adhesion desired. Although many finishes are known to the art, it has been found that the excellent chemical adhesion achieved by a coating of bronze or brass is highly satisfactory. In any event, the helical configuration of the wire filaments themselves increase the adhesion between the fabric body and the wire in a mechanical sense.

Figure 1:
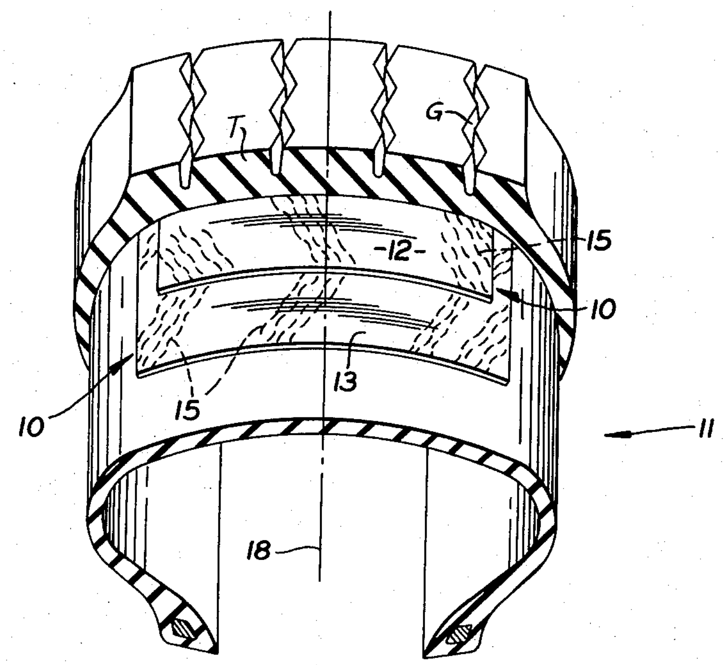
FIG. 1 is a cross sectional perspective of a tire progressively cut away to reveal a pair of circumferential breaker plies comprised of fabric embodying the concept of the present invention interposed between the carcass and the tread ply.

As shown in FIG. 1, the filaments—i.e., the cylinders outlined by their helical configuration—are substantially parallel and are preferably oriented angularly with respect to a circumferential frame of reference—i.e., the filaments are biased with respect to a radial plane 18 perpendicular to the rotational axis of the tire 11. Although the helical configuration of the reinforcing filaments 15 permits them to accept compressive stresses applied axially of the helix with the same facility that they accept tensile stresses, it has been found highly desirable to bias the filaments and thereby affect dissipation of the compressive wave that forms in the tire just ahead of its contact with the roadway.

Figure 5:
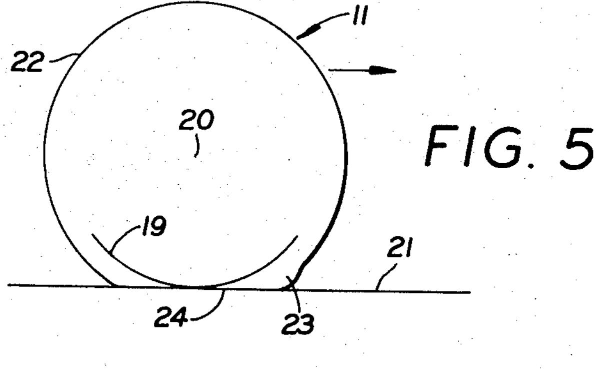
FIG. 5 is a schematic side elevation of a tire in contact with a roadway to show the compressive wave formed in the tire as a result of having the rolling circumference of lesser dimension than the actual circumference, as generally occurs with low pressure tires.

Particularly with the modern day, relatively low pressure tires, the rolling circumference of the tire is generally noticeably less than the actual circumference of the tire. As shown in FIG. 5, the rolling circumference 19 is a circle concentric about the rotational axis 20 of the tire 11 and tangent to the roadway 21. Because this rolling circumference is of lesser dimension tan the actual outer circumference 22 of tire 11, as the tire rolls along the roadway the tire tends to bunch, or gather, in a roll-like compressive wave 23 immediately ahead of that area 24 of the tire 11 that makes contact with the roadway 21.

The formation of the wave 23 imparts a definite compressive stress to any generally circumferentially oriented reinforcement in the tire and circumferentially oriented reinforcing tends to increase the magnitude of the wave formed. The major portion of the resulting compressive stress tends to be particularly concentrated from contact area 24, through the wave 23 and into the tire circumferentially ahead of the wave. The application of such compressive stresses is particularly deleterious to glass fiber reinforcing, but irrespective of the particular reinforcing material, the flexure of the tire occasioned by the compressive wave 23 tends to induce an undesirable accumulation of heat in the tire. Heat accumulation can itself lead to tire failure, but fabric reinforced with helical wire filaments oriented on the bias can alleviate this problem by their tendency to dissipate rather than compound the wave, thereby minimizing excessive heat accumulation. Accordingly, even though the continuous application of compressive stresses will not adversely affect the helical filaments, it is highly desirable that the filaments in superimposed plies be inclined in opposite directions not only to enhance the directional stability of the tire but also to induce dissipation of the compressive wave from the medial portion of the tread toward each side thereof along the direction in which the filaments are respectively biased.

Even a modest angular orientation of the filaments to at least 4° with respect to the circumferential reference plane 18 will induce the desired dissipation of the compressive wave. The rapidity of this dissipation is increased as the degree of angular bias is increased, but the bias of the filaments in the belt plies 12 and 13 must not be too great or the function of the belts to maintain a substantially fixed circumferential dimension for the tire could be lost. The bias selected will thus generally constitute a compromise between the rate at which one wishes to dissipate the compressive wave and the degree to which one wishes to tolerate circumferential elasticity.

Figure 2:
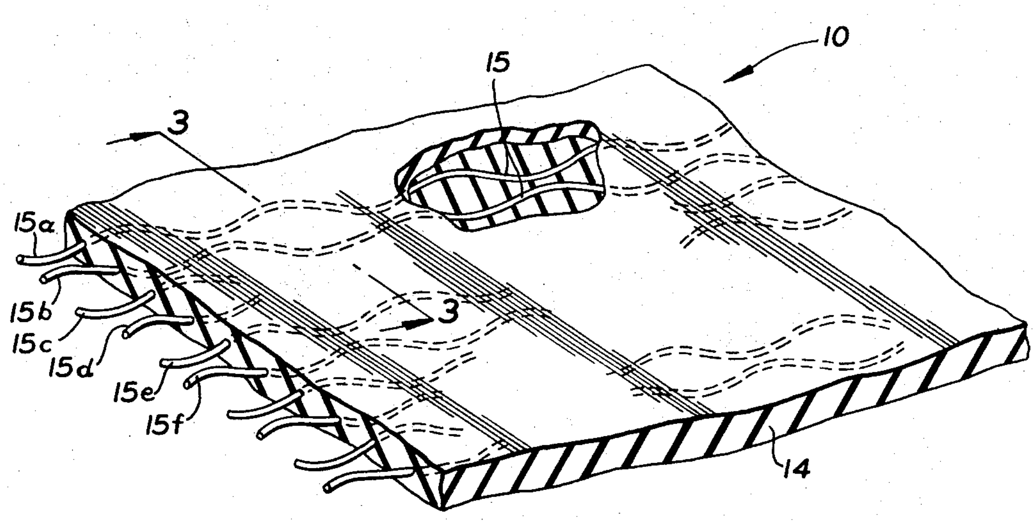
FIG. 2 is an enlarged perspective of a swatch of tire fabric embodying the concept of the present invention with the elastomeric body thereof partially broken away to reveal the single filament wire reinforcing therein, said wire reinforcing also being depicted as extending outwardly from the edge of the swatch.

As is best shown in FIGS. 2 and 3, the successive, generally parallel, filaments are preferably of opposite hand. That is, filaments **15*a*, 15*c* and 15*e*, etc., delineate a helical path of one hand, and filaments 15*b*, 15*d*, 15*f*, etc. delineate a helical path of opposite hand. Reverting to FIG. 3, the helix developed by filaments 15*a*, 15*c*, etc., would follow a clockwise path if extended toward the viewer of that figure, and the helix developed by filaments 15*b*, 15*d***, etc., would follow a counterclockwise path if those filaments were extended toward the viewer. In this way the "nerve"—i.e., any tendency to rotate in response to internal stresses—of any filament will be stabilized by the nerve of the adjacent filaments. That is, the tendency of energy stored in any filament to cause that filament to spring counter the hand in which it is helically laid and thereby bend the fabric, or at least reduce its flexibility, will be stabilized by any energy stored in adjacent filaments that would tend to cause those filaments to spring counter the hand in which they are helically laid. Accordingly, the pliability of the fabric will not be adversely affected by energy stored within the filaments, although if the apparatus hereinafter described is used to form the filaments internal stresses are almost wholly precluded.

Figure 6:
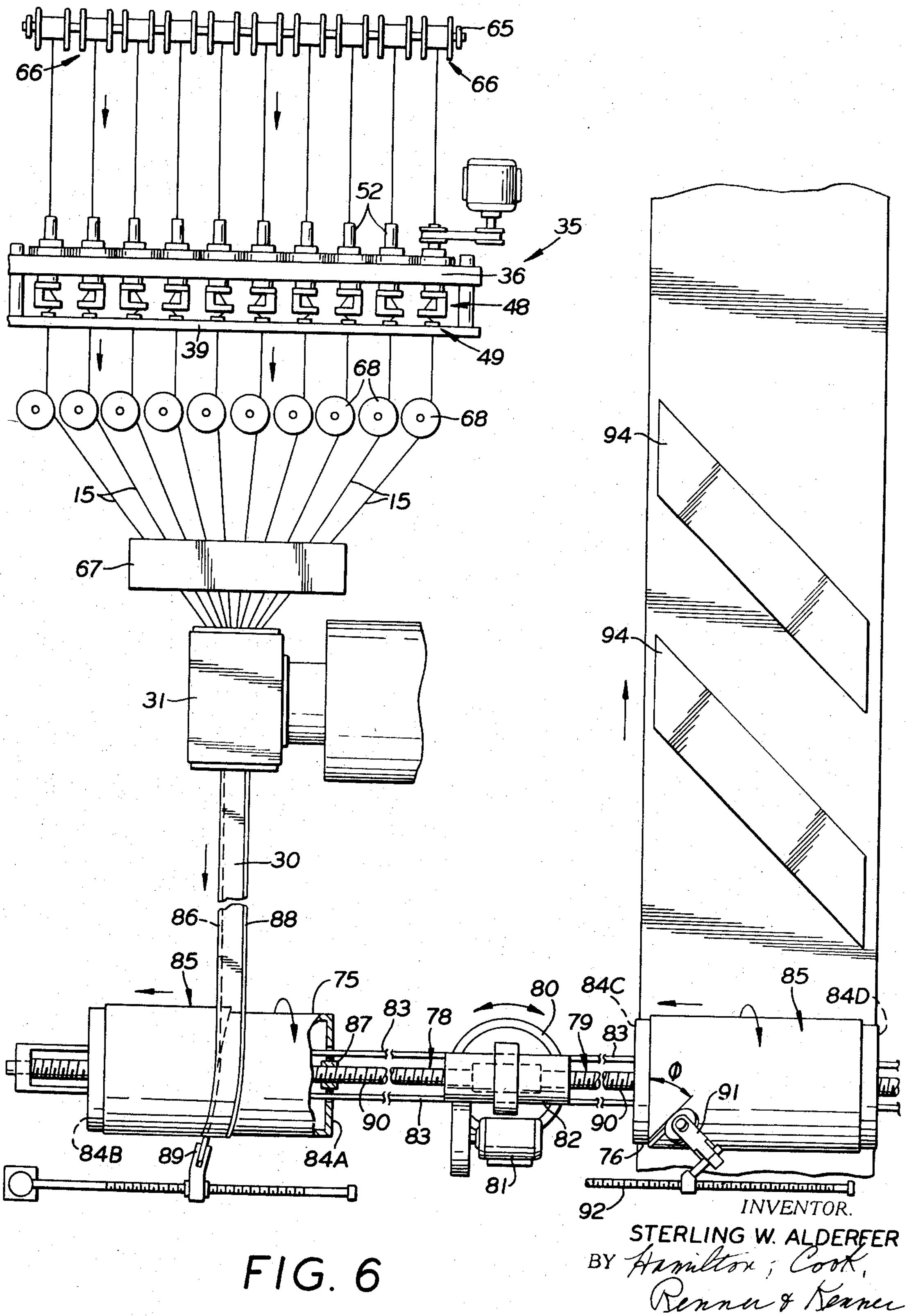
FIG. 6 is a schematic plan view of one preferred form of an apparatus for making the fabric depicted in FIG. 2 and forming it into a ply strip.
Figure 7:
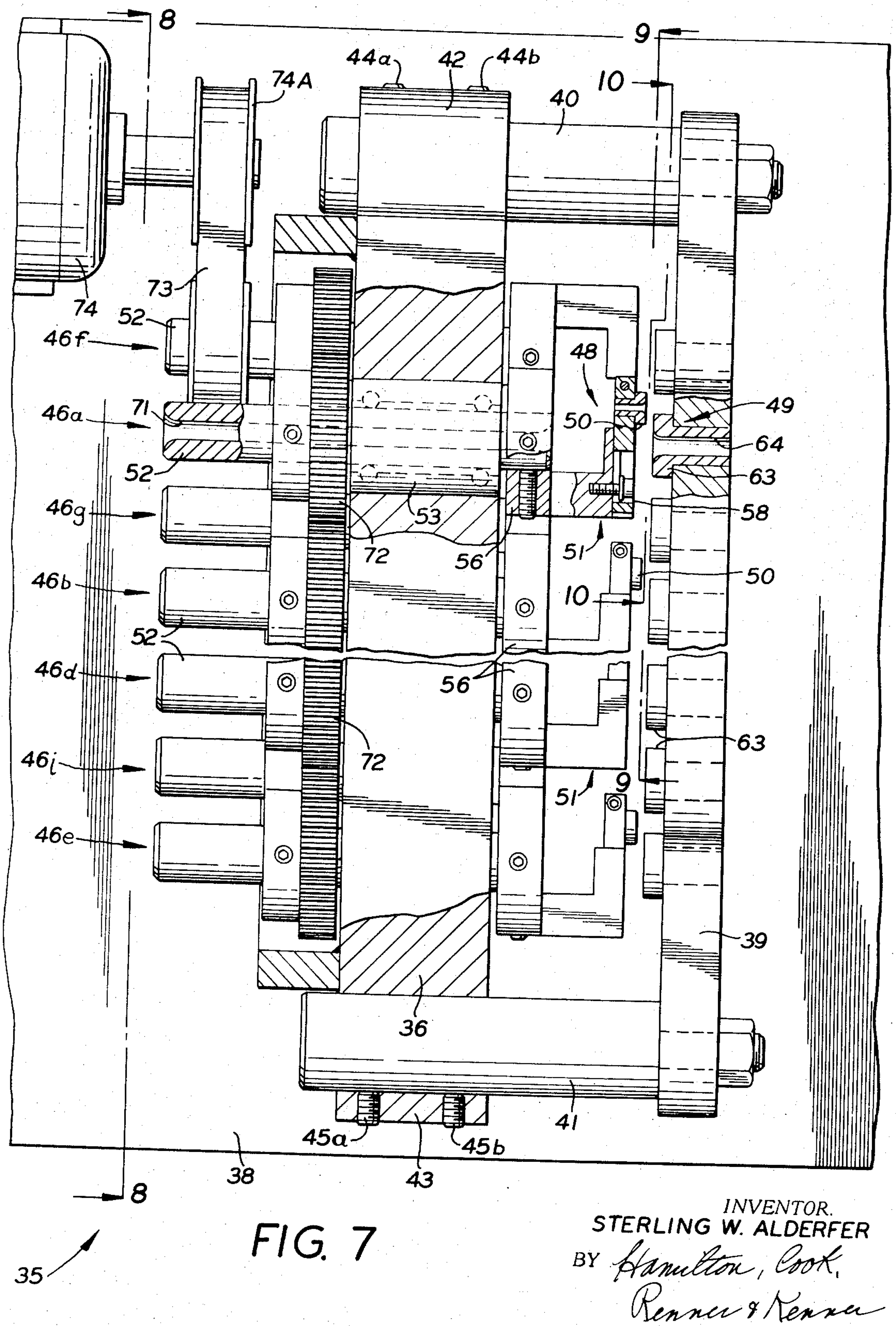
FIG. 7 is an enlarged top plan, partially broken away and partially in section, of the twisting mechanism schematically represented in FIG. 6.

Fabric embodying the concept of the present invention can, of course, be made by calendering the filaments 15 with the elastomeric body 14. However, calendering may well be eliminated. As shown in FIG. 6, an elastomeric ribbon 30 may emanate from an extruder head 31—the ribbon 30 containing a plurality of filaments 15 oriented generally parallel to each other and longitudinally of the ribbon 30. The filaments are helically formed in a twisting mechanism indicated generally by the numeral 35. Because a plurality of filaments are simultaneously being fed into the extruder head 31 for incapsulation within the ribbon 30, the twisting mechanism 35 may be compounded simultaneously to form the required number of filaments. However, it should be appreciated that the filaments could just as well be separately formed, spooled and stored for subsequent use. In either event, the fundamental concept of the preferred twisting mechanism 35 could be employed.

As best seen in FIGS. 7 through 11, the twisting mechanism 35 has a head plate 36 that extends vertically from a bed plate 38. A tail plate 39 is positioned laterally of the head plate 36 and is selectively movable toward and away from the head plate, as by a pair of support beams 40 and 41 secured to the tail plate 39 and slidably received within corresponding collars 42 and 43 mounted on the head plate 36. A pair of set screws **44*a* and 44*b* may be received within the collar 42 and a similar pair of set screws 45*a* and 45*b* may be received in collar 43 for engaging the beams 40 and 41, respectively, and thereby locking the tail plate 39 in selectively spaced relation from the head plate 36**.

The head and tail plates support a plurality of twisting bays **46*a*, 46*b*, etc.—ten such twisting bays being utilized in the preferred embodiment depicted. Each bay may be identical so that only bay 46*a* need be described in detail. Bay 46*a* comprises a first orifice means 48 operatively mounted on the head plate 36 and a second orifice means 49 mounted on the tail plate 39 in cooperative relation to the first orifice means 48**.

Figures 9, 10, 11:
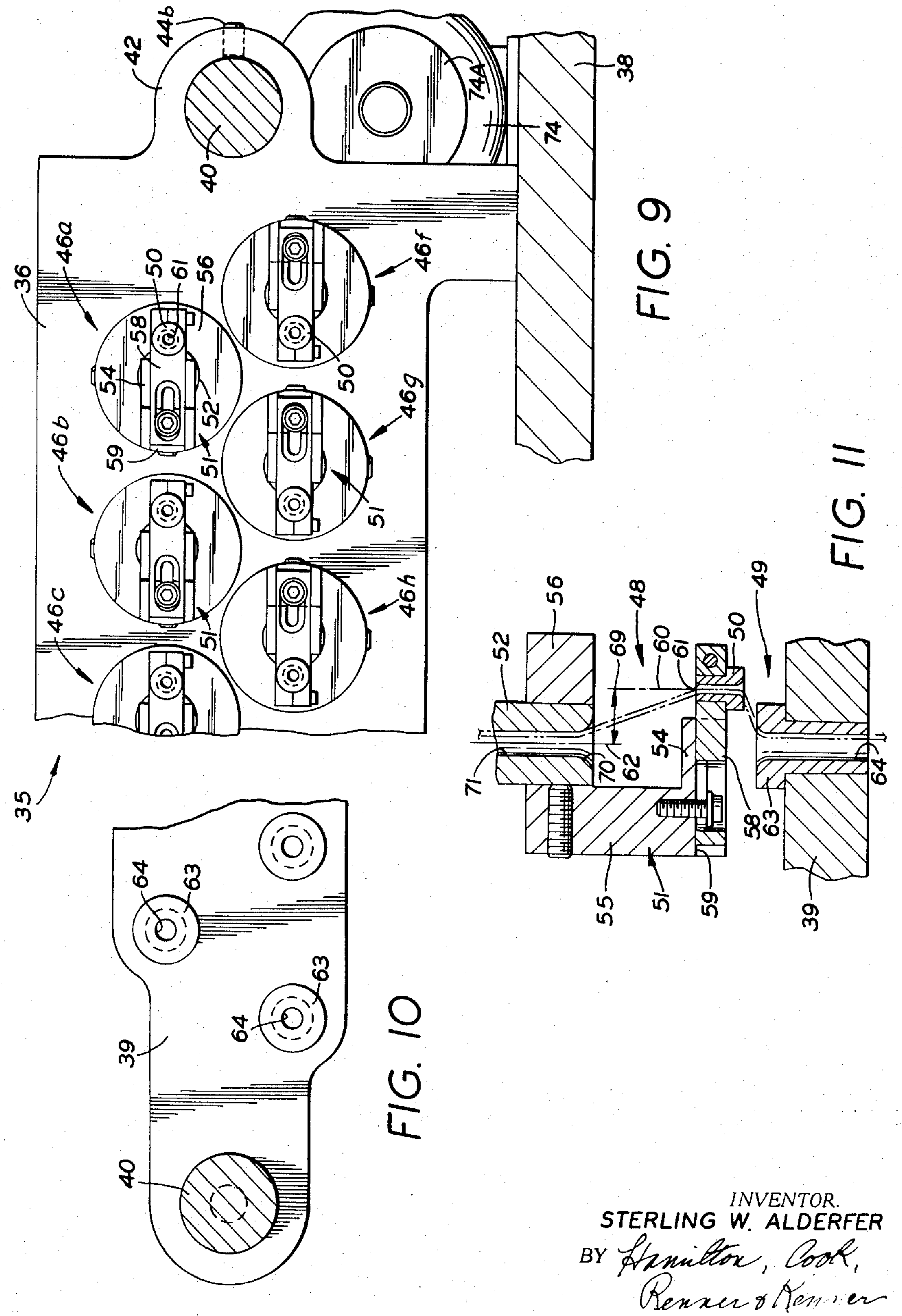
FIG. 9 is a vertical section taken substantially on line 9—9 of FIG. 7 depicting the head plate and the rotatable first orifice means carried thereon in elevation.
FIG. 10 is a vertical elevation taken substantially on line 10—10 of FIG. 7 depicting the tail plate and second orifice means of the twisting mechanism in elevation.
FIG. 11 is an enlarged cross section of a portion of FIG. 7 depicting the relationship of the first and second orifice means as a wire is being helically formed thereby and further depicting the chuck and spindle means on which the first orifice means is rotatably carried and the tail plate in which the second orifice means is fixed.

As best seen in FIG. 11, the first orifice means 48 comprises a first die head 50 mounted in an eccentric chuck 51, the chuck 51 being secured to a hollow spindle 52 journaled in a bearing 53 (FIG. 7) supported on the head plate 36. The chuck 51 has a face plate 54 supported on an extension arm 55 that positions the face plate 54 axially outwardly of a base plate 56.

The die head 50 is lockingly secured within the bifurcated end of a jaw plate 58 that is itself selectively positionable along a diametric slideway 59 in the face plate 54 to provide precise adjustment of the die head 50 with respect to the spindle 52—specifically, an adjustment to vary the eccentricity of the axis 60 of the bore 61 through die head 50 with respect to the rotational axis 62 of the spindle 52.

The second orifice means 49 comprises a second die head 63 secured within the tail plate 39 so that the axis of the bore 64 therethrough is preferably coincident with the rotational axis 62 of the spindle 52.

The twisting mechanism is provided with a bracket 65 (FIG. 6) on which a plurality of feed spools 66—one for each twisting bay 46—of high carbon steel wire, suitably plated, is mounted. The wire feeds from each spool 66, through the corresponding spindle 52, sequentially between the first and second spaced orifice means 48 and 49, around a capstan 68, through an oven 67 and then to the extruder head 31. The oven 67 is employed to remove moisture from the wire before it enters the extruder head 31. The capstan 68 is preferably located so that the path of the filament leading thereto substantially aligns with the axis 62 of the second orifice means 49. It should also be appreciated that were the wire not to be fed directly to the extruder head, individual take-up spools, not shown, for each filament would be substituted for the extruder head.

By varying the spaced relation between the two orifice means, the eccentricity of the two orifice means (the lateral separation of the two orifice means 48 and 49, dimension 69, must exceed the combined radii of the bores 61 and 64 through the two orifice means 48 and 49), the speed at which the one orifice means is rotated with respect to the other orifice means and the speed at which the wire traverses the two orifice means, one can precisely control the dimensions of the helix formed in the filament passing through the twisting mechanism 35.

Although the feed spools 66 may be mounted on individual brackets that could be synchronously rotated with the corresponding first orifice means 48 so that the wire is coiled into a helix, it has been found that this method tends to store too much energy within the wire merely as a result of the coiling and that this energy manifests itself as excessive nerve in the filament encapsulated within the fabric body 14. This nerve can be virtually eliminated by working the metal of the wire to form the helix. That is, by feeding the wire into the orifice means 48 and 49 from spools of fixed orientation, the relative rotation of the orifice means, and their respective spacing, will work, or cold form, the metal into the desired helical path so that the molecular orientation of the wire maintains the helical configuration.

The wire is formed as it passes between the die heads 50 and 63 of the two orifice means 48 and 49. The flared opening 70 (FIG. 11) of the bore 71 through spindle 52 and the axially spaced relation of the face plate 54 from the base plate 56 prevents working of the metal until such time as it passes between the two orifice means, even though the path of the wire is radially inclined as it extends between the spindle 52 and the first die head 50. The axially spaced relation of the face plate 54 from the base plate 56 also facilitates threading the wire from the spindle 52 to the first die head 50 when setting up the twisting mechanism 35.

In general, it has been found that a relatively long lay helix, in combination with the diametric range described above, will provide the necessary reinforcement to resist undesirable elasticity in the finished tire under normal operating conditions and yet will accommodate peak stresses such as are encountered when a tire strikes an obstruction without, in most situations, exceeding the elastic limit of the wire itself. Continuing with the examples of the 0.016″ diameter filament, one and one-half to three leads per inch should be quite satisfactory.

Figure 8:
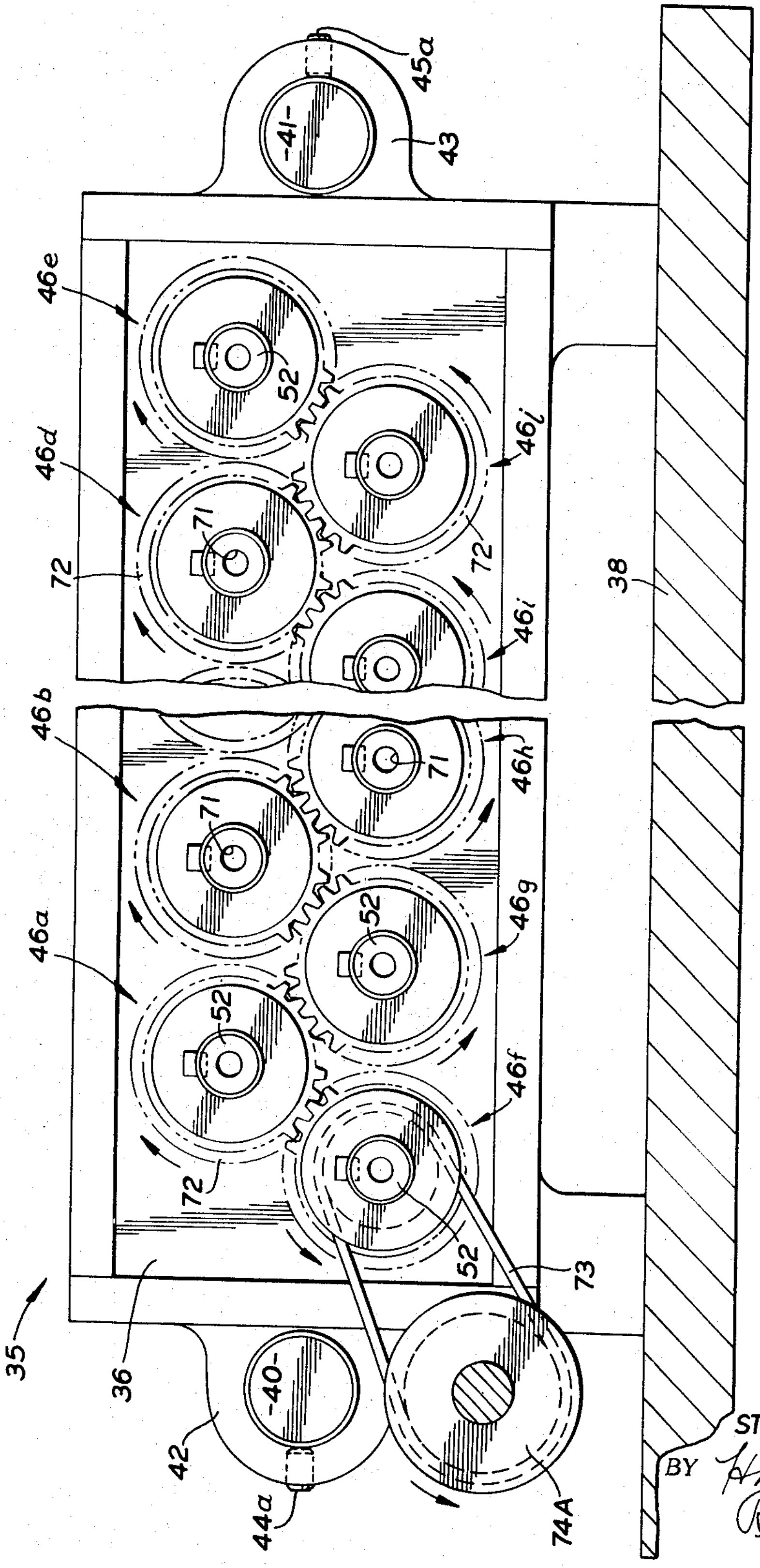
FIG. 8 is a vertical section taken substantially on line 8—8 of FIG. 7 depicting in elevation, a plurality of twisting bays, the head plate and particularly the interconnecting spindle means to secure counterrotation in successive bays.

One convenient way in which to achieve helices of opposite hand for successive filaments is to secure a spur gear 72 on the spindle 52 in each bay 44*a*, 44*b*, etc., and have the spur gears 72, etc., on successively located spindles 52 intermesh, as shown in FIG. 8. In that way driving one spindle, such as spindle 52 in bay 46*f*, by a belt 73 from a drive means such as motor 74 and motor pulley 74A will rotate the orifice means 48 forming successive filaments in opposite directions and will, therefore, form the successive wire in helices of opposite hand.

As the ribbon 30 emerges from the extruder head 31 it may be wound onto a forming drum 75. As best shown in FIG. 6, a pair of forming drums 75 and 76 may be mounted on support beams 78 and 79, respectively, extending oppositely from a carrousel 80. Each forming drum is provided with a means to rotate the drum. As shown in FIG. 6, a motor means 81 may rotate a drive sleeve 82. A plurality of fingers 83 extend outwardly from the drive sleeve 82 in spaced, parallel relation to the beams 78 and 79 and slidably engage appropriate bores in the radially oriented heads 84A and 84B on drum 75 and identical heads 84C and 84D on drum 76. Rotation of that drum which is aligned with the extruder head 31 wraps the ribbon 30 thereabout, and a positioning guide assures that the successive wraps of the ribbon are contiguous.

In order to stitch the successive wraps and thereby assure an integral annulus 85 of the fabric on the drum, it is desirable that the edges 86 and 88 of the ribbon 30 be inclined so that the pressure of a roller 89 will assure stitching the overlapping edges of the successive wraps of ribbon.

As noted above, a guide means should be employed to assure that each wrap of the ribbon is positioned in contiguous contact with the previous wrap. Such a guide means may comprise a head, not shown, movable at a predetermined rate in a path parallel to the drum, or the guide may comprise thread means 90 on the support beams 78 and 79 which, when contacted by the threaded collar 87 at the center of the heads 84A through 84D, provide for a controlled axial displacement of the forming drum in response to rotation thereof.

In either event, a ribbon 30 approximately one inch wide is a convenient width to wrap and also a convenient width so as not to overly compound the number of bays required for the twisting mechanism 35. Again to continue the example of 0.016″ diameter reinforcing wire, ten such filaments per ribbon would epitomize a typical construction.

Figures 12, 13:
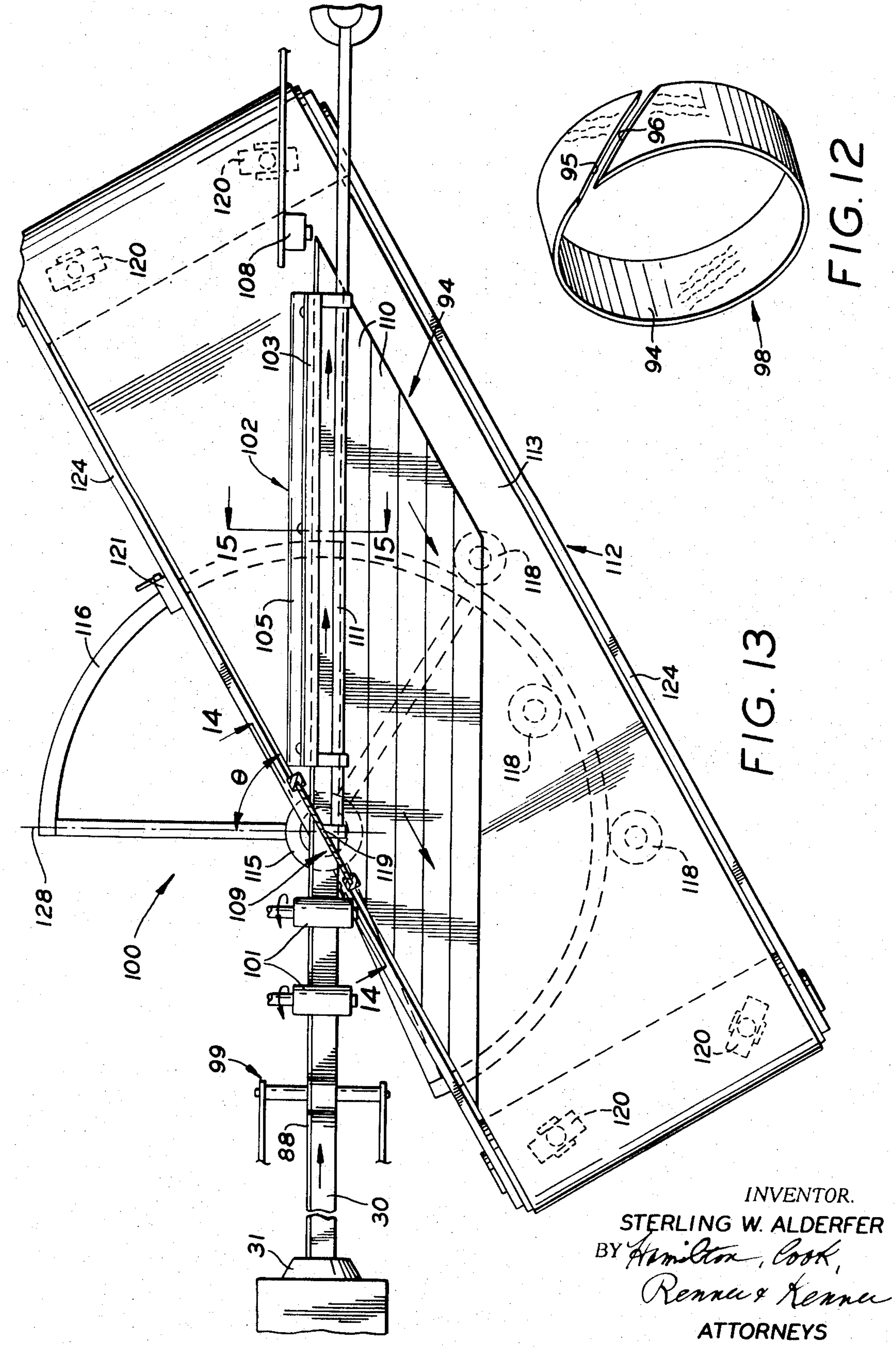
FIG. 12 is a perspective view of a belt hooped from a ply strip of fabric embodying the concept of the present invention and on the apparatus thereof.
FIG. 13 is a plan view of an alternative form of apparatus for receiving ribbon extruded to encapsulate wire reinforcing filaments and assembling a plurality of strips cut from such a ribbon into a ply strip that can also be hooped into a belt having a predetermined bias of the reinforcing filaments therein, such as depicted in FIG. 12.

After the annulus 85 is completed on drum 75, the ribbon 30 may be severed, the carrousel 80 rotated through 180°, the free end of the ribbon attached to drum 76 and the drum 76 rotated to wind an annulus thereon. The aforesaid rotation of the carrousel would bring the drum 75 into contact with a cutting head 91 mounted on a traversing shaft 92 in the same fashion as drum 76 was previously in contact therewith when the ribbon was being wound onto drum 75, as shown. Coordination of the rate at which the drum 75 is rotated with the rate at which the cutting head 91 traverses the shaft 92 controls the lead angle $\phi$ at which the annulus 85 is helically slit. This lead angle $\phi$ also equals the degree to which the reinforcing filaments 15 in the resulting ply strips 94 are angularly oriented with respect to a circumferential reference plane when the ply strip 94 is hooped. As is best seen in FIG. 12, by abuttingly juxtaposing the biased ends 95 and 96 of the ply strip 94 a continuous belt 98 is formed without any waste—the dimensions of the belt and the angular inclination of the reinforcing filaments therein being controlled by the dimensions of the annulus 85 and the lead angle $\phi$ at which the annulus 85 is slit. Specifically the width of the belt would equal the circumference of the annulus multiplied by the size of the lead angle $\phi$. The circumference of the belt would equal the width of the drum divided by the sine of the lead angle $\phi$ and that quotient diminished by the product of the circumference of the drum multiplied by the cosine of the lead angle $\phi$. The derivation of this last formula can be understood by realizing that the progress of the cutting head 91 axially along the drum 76 for each revolution of the drum is equal to the product of the circumference of the annulus multiplied by the tangent of the lead angle $\phi$ so that by dividing the width of the annulus 85 by the axial progress of the cutting head per revolution of the drum the total number of revolutions required completely to slit the annulus can be computed. The incremental dimension of the belt, measured circumferentially thereof, provided by each full revolution of the drum with respect to the cutting head would equal the product of the circumference of the annulus 85 multiplied by the secant of the lead angle $\phi$ so that the total circumference of the belt 98 would equal the incremental dimension of the belt achieved per revolution of the drum multiplied by the number of revolutions completely to slit the annulus less the amount of the overlapped edges 95 and 96 projected upon the circumferential dimension—i.e., less the circumference of the drum multiplied by the cosine of the lead angle $\phi$.

Another procedure may be followed with equal facility to make a ply strip 94. As the ribbon 30 leaves the extruder head 31 it preferably passes through an accumulator means 99 and then to a ply strip forming mechanism 100 (FIG. 13). One or more feed rolls 101 slide the ribbon along a receiving means 102.

Figure 14:
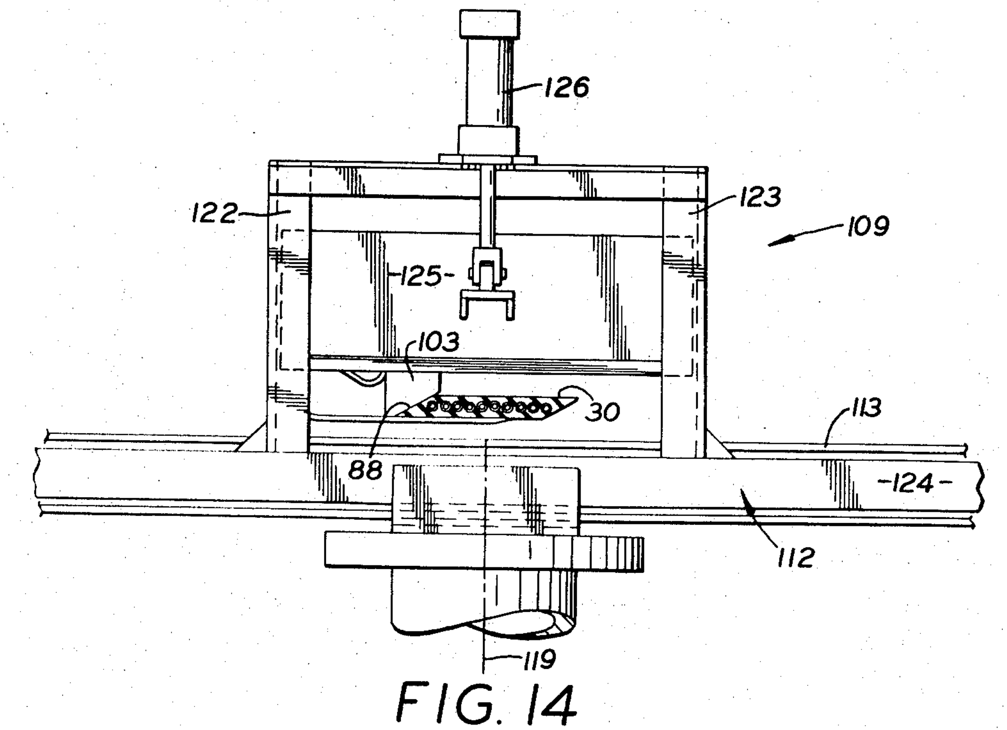
FIG. 14 is an enlarged section taken substantially on line 14—14 of FIG. 13 depicting the guillotine blade poised to sever the strip of ribbon supported on the receiving means from the continuous ribbon emanating from the extruder head.
Figure 15:
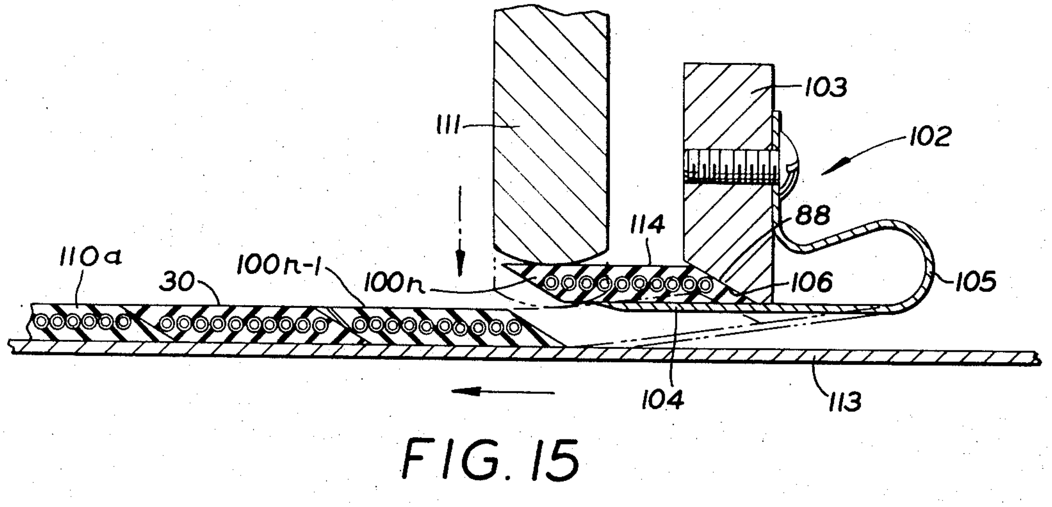
FIG. 15 is an enlarged section taken substantially on line 15—15 of FIG. 13 depicting the stitcher press depositing the severed strip supported on the receiving means onto the forming table and joining it to the previously deposited strip.

As best shown in FIGS. 14 and 15 t he receiving means 102 preferably comprises a support shelf 104 resiliently supported by a spring arm 105 anchored to a locating bar 103 independently located upwardly of a forming table 112. The locating bar 103 serves as a guide and is preferably undercut, as at 106, to conform to the inclined edge 88 of ribbon 30. The locating bar 103 is fixedly positioned in parallel relation with the direction along which the ribbon is fed.

After a predetermined length of the ribbon is deposited on the support shelf 104 a sensor mechanism 108 causes the feed rolls 101 to stop, a cutter mechanism 109 to sever an elemental strip 110 from the ribbon 30 and a stitcher press 111 to deposit the elemental strip 110 on a forming table 112 and join it to that elemental strip (chain line representation in FIG. 15), if any, previously deposited thereon. Thereafter the feed rolls 101 propel another length of ribbon 30 onto the support shelf 104, and the cycle is repeated.

After each elemental strip is deposited on the table 112 it must be indexed so that the successive elemental strips can each be deposited in contigous relation with the previous strip. This result may be accomplished by incorporating a conveyor belt 113 into the table 112, as shown, which intermittently stages to advance the newly deposited elemental strip a distance equal to the dimension of the upper face 114 of the strip 110 measured in a direction parallel to the direction in which the conveyor moves—i.e., the extruded width of face 114 multiplied by the secant of the angle $\theta$ (hereinafter defined).

Forming table 112 is pivotally mounted on a base 115 for selective angular orientation transversely with respect to the direction in which the ribbon is fed onto the support shelf 104. As shown in FIG. 13, a guide ring 116—annular through approximately three quadrants—extends upwardly of the base 115 and is engaged by follower means in the form of rollers 118 dependingly supported from beneath table 112 so that the table can be swung about an axis 119 passing through the center of the guide ring 116. A plurality of casters 120 are secured to the table 112 to accommodate swinging of the table, and clamping means 121 may be secured to the table 112 for lockingly engaging the guide ring 116 whereby to secure the table in selective angular orientation.

The cutter mechanism 109 (FIG. 14) is supported on the table 112, as by a pair of guide posts 122 and 123 extending upwardly from the frame 124 of the table 112 and a guillotine blade 125 is mounted therebetween for controlled vertical reciprocation, as by air cylinder 126. One or more similar air cylinders, not shown, may also actuate the stitcher press 111 from the solid line representation in FIG. 15 to the chain line representation and thereby deposit the strip 110($n$) on conveyor 113 and join it to strip 110 ($n-1$).

With both this apparatus and that previosuly described stitching is enhanced when the assembly of the ply strip occurs while the ribbon is still warm and fresh from the extruder head.

By mounting the cutter mechanism 109 directly on the table 12—and in such a position that the blade 125 spans and is operable along the axis 119 about which the table 112 can be swung—no matter what angular orientation of the table 112 is selected with respect to the direction in which the ribbon 30 is fed thereover, the elemental strips 110 will be severed along a plane parallel to the direction in which the strips 110 are indexed on conveyor belt 113. In that way the ply strip 94 formed on table 112 can be hooped into a continuous belt 98 without waste. It must be appreciated, however, that when using strip forming mechanism 100 the edge 86 on that portion of ribbon 30 forming the first elemental strip 110($a$) in ply strip 94 constitutes the biased end 95 thereof, and the edge 88 on that portion of ribbon 30 forming the last elemental strip 110($n$) in ply strip 94 constitues the biased end 96 thereof. Thus, the two biased ends 95 and 96 are mating edges 86 and 88 that can be abuttingly juxtaposed to form the continuous belt 98.

By varying the angular disposition of the table 12 with respect to a reference plane 128 oriented transversely of the direction in which the ribbon is fed onto the support shelf 104—angle $\theta$, the length of each elemental strip 110 and the number of elemental strips forming the ply strip 94, one can preselect the circumference of the belt 98, its width and the angular orientation of the reinforcing filaments 15 therein with respect to a circumferential reference plane. That is, the circumference of the belt 98 would be equal to the number of elemental strips 110 multiplied by the extruded width of each face 114 and that product multiplied by the secant of the angle $\theta$. The width of the belt 98 would equal the length of one elemental strip multiplied by the cosine of the angle $\theta$ and the angular orientation of the reinforcing filaments would equal $90-\theta$ degrees.

Although the two forms of the above described apparatus are particularly adapted for use with a fabric reinforced with single filament wires, it must be appreciated that the apparatus can as well be adapted for use with prior known wire reinforcing configurations to eliminate calendering and bias cutting.

At the time this invention was made the argument still raged as to whether the belted/bia-ply or the radial ply tire was the tire of tomorrow. Both, however, employ a substantially inextensible belt, or breaker ply, between the carcass and the tread. Before the advent of these two concepts for tire construction the carcass of the conventional tire comprised a plurality of plies in which the reinforcing material was biased with respect to a circumferential frame of reference. The belted/biias-ply tire employs an identical carcass with one or more breaker plies circumferentially hooping the tire. The radial ply tire, while also employing a circumferential breaker ply, has a carcass in which the ply reinforcing material is radially oriented—i.e., the reinforcing material is biased at 90° with respect to the forementioned circumferential frame of reference.

The mere addition of a circumferentially nonextensible belt in the finish tire, however, has caused a considerable difference in the way tires can be made. The conventional, beltless tire was made by applying the various plies in the form of a band over a cylindrical building drum, securing the beds at the opposite ends of the band, applying the tread stock to the medial portion of the band, removing the band from the building drum and reshaping the band from its annular configuration into the familiar toroidal form of a tire. During this shaping operation the medial portion of the band must be stretched radially of the beads for the toroidal shape to be achieved. As such, the application of one or more substantially inextensible breaker plies as well as the tread stock, has heretofore been deferred until the tire carcass had achieved its toroidal form, and this added a considerble amount to the cost of building both belted/bias-ply and radial ply tires.

Figure 16:
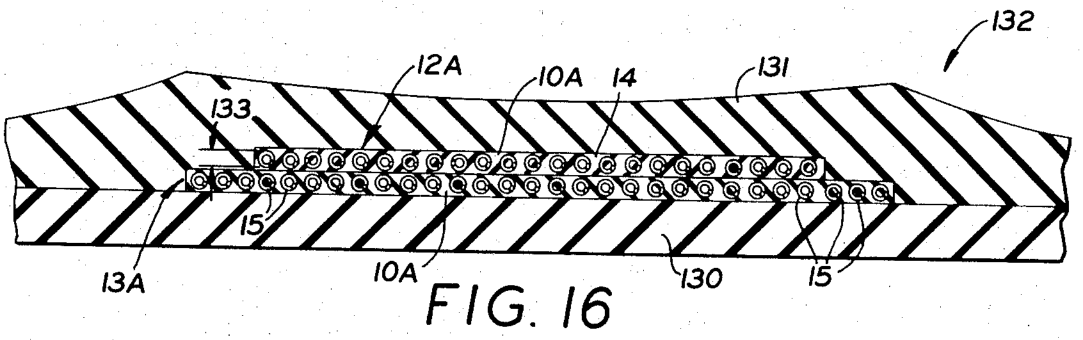
FIG. 16, incorporated on the same sheet of drawing as FIGS. 3–5, is a cross section through the medial portion of a cylindrical tire band before it has been shaped into the familiar toroidal form depicting a pair of hooped ply strips interposed between the carcass and the tread stock, the ply strips being capable of predetermined elongation to accommodate shaping of the tire and thereafter providing a pair of substantially inextensible belts, as depicted in FIG. 1.

However, by using a fabric reinforced with helical filaments embodying the concept of the present invention for the breaker ply, the breaker plies can be applied either after the toroidal shape has been achieved or while the band is still in its annular shape on the building drum. If the former approach is desired, the dimensions of the helices delineated by the reinforcing filaments 15 are chosen to afford no more than one-half to one and one-half percent elongation under normal loading on the tire 11. However, should one desire to apply the breaker plies as set forth in the latter approach, the twisting mechanism 35 would be adjusted to form a helix having a diameter and lead such that as the annulus is stretched into the toroidal form, the individual reinforcing filaments 15 will, along with the uncured elastomeric body 14, elongate to provide the stretch required. FIG. 16 represents two layers 12A and 13A of fabric 10A interposed between the carcass plies 130 and the tread stock 131 in the medial portion of a cylindrical tire band 132. The diameter 133 of the helix delineated by each filament 15 exceeds three times the diameter of the filament 15 so that the filament will provide the elongation required to accommodate the stretch incident to the shaping of the annular tire band into a tire. The twisting mechanism 35 affords such precision to the formation of the helices that they can be predetermined to provide the exact elongation required and still have the desired reserve elongation of less than one and one-half percent under normal loading without approaching the elastic limit. The body 14 of the fabric 10A depicted in FIG. 16 must also be of thicker dimension than that of the fabric 10 of the belts 12 and 13 depicted in FIG. 1 in order to accommodate the stretch imposed to shape the tire.

It should also be appreciated that during the elongation of the filaments some internal stresses will be occasioned but that the resulting nerve will not be evidenced by undesirable characteristics in the fabric if the helices of the successive filaments are formed of opposite hands, as heretofore discussed.

Figure 17:
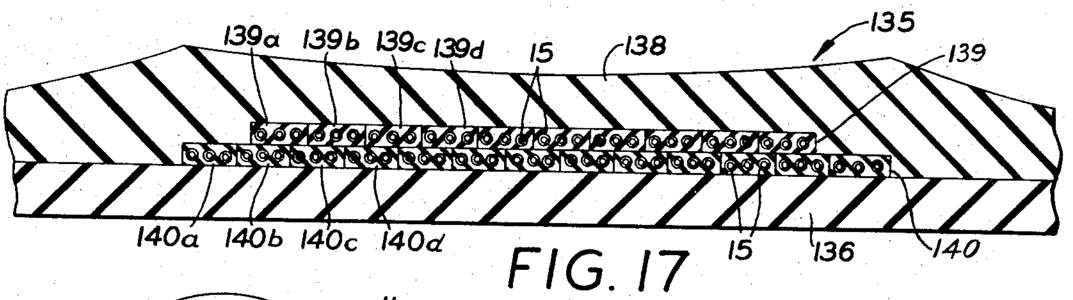
FIG. 17, also incorporated on the same sheet of drawings as FIGS. 3–5, is a view similar to FIG. 16 depicting an alternative form for the ply strips.

Controlled elongation of the breaker plies during the shaping of the tire can also be achieved by the use of a plurality of narrow plies. As shown in FIG. 17, the tire band 135 has the customary carcass plies 136 and tread stock 138, but in addition the breaker plies 139 and 140 comprise a plurality of narrow ply stripes, **139*a*, 139*b*, 139*c*, etc., and 140*a*, 140*b*, 140*c*, etc., respectively. These narrow strips while having a body thickness somewhat greater than the standard fabric 10 in order to accommodate the stretch incident to subsequent shaping, employ reinforcing filaments 15 substantially identical with those depicted in FIGS. 1 through 4. Because the breaker plies are comprised of narrow strips, the reinforcing filaments are discontinuous across the width of the tire and their angular orientation can, therefore, as the band 135 is formed into a tire, freely shift with respect to a circumferential reference plane and thereby neither elongate nor restrict expansion of the band. After the tire is cured, however, the elastomeric body portions of the multiple strips vulcanize together, and particularly with the reinforcing filaments in one ply overlapping, or bridging, the discontinuity of the reinforcing filaments in the other ply, as shown, the substantial inextensibility of plies 139 and 140** is achieved in the cured tire.

It should now be apparent that a tire tabric reinforced with a single, helically formed wire filament will permit controlled elongation both to permit shaping of the cylindrical tire band into the toroidal configuration of a finished tire and to accommodate loading on the tire during use without exceeding the elastic limit of the wire, without restricting the desired flexibility of the fabric and without fatiguing the wire. Moreover, it is apparent that the filament can be accurately formed into a precisely controlled helix by the apparatus disclosed herein and that the reinforcing filaments can be incorporated within the fabric by means other than calendering to minimize waste and permit preselection of the desired bias of the wire with respect to the tire in which the fabric is used.

I claim:

1. A reinforced tire fabric comprising, an elastomeric body, a plurality of individual, single filament reinforcing wires, said filaments being laterally spaced in said body, each said filament delineating an elongated helix, the diameter of said elongated helix being up to approximately three times the diameter of the filament forming said helix.

2. A tire fabric, as set forth in claim 1, in which the molecular orientation of the wire maintains the configuration of an elongated helix.

3. A tire fabric, as set forth in claim 2, in which approximately one-half of said filaments delinate an elongated helix of one hand and one-half of the opposite hand.

4. A tire fabric, as set forth in claim 3, in which successive filaments are of opposite hand.

5. A tire fabric, as set forth in claim 2, in which there are between one and one-half to three loads per inch in the helices delineated by the filaments.

6. A reinforced fabric of at least one ply, each said ply comprising; an elastomeric body, a plurality of discrete, single filament reinforcing wires being laterally spaced in said body, each said filament delineating an elongated cylindrical helix, the diameter of said elongated helix being up to approximately three times the diameter of the filament forming said helix, the pitch of said elongated helix being between approximately one and one-half to three leads per inch, and the diameter of said helix and the pitch thereof being dimensioned with respect to the diameter of the wire filament so as to provide no more than seven percent elongation of the helix within the elastic limit of the wire.

References Cited

UNITED STATES PATENTS

| | | | |
|---|---|---|---|
| 3,273,978 | 9/1966 | Paul | 161—143 X |
| 3,486,546 | 12/1969 | Sidles et al. | 161—144 X |
| 3,032,963 | 5/1962 | Fenner | 161—144 X |
| 3,597,303 | 8/1971 | Tanaka | 161—144 |
| 1,800,179 | 4/1931 | Darrow | 161—47 X |
| 3,449,199 | 6/1969 | Mead | 161—47 |

PHILIP DIER, Primary Examiner

U.S. Cl. X.R.

156—124; 161—144, 152

UNITED STATES PATENT OFFICE
CERTIFICATE OF CORRECTION

Patent No. 3,778,329 Dated December 11, 1973

Inventor(s) Sterling W. Alderfer

It is certified that error appears in the above-identified patent and that said Letters Patent are hereby corrected as shown below:

Column 1, line 23, before "opposite" insert --of--; line 35, after "1970", change the period (.) to a comma (,) and add --now Patent No. 3,682,222--; line 61, "other" should read --others--.

Column 2, line 4, "later" should read --late--.

Column 11, line 74, "table 12" should read --table 112--.

Column 12, line 17, "table 12" should read --table 112--; line 40, "bia-ply" should read --bias-ply--; line 47, "biias-ply" should read --bias-ply--; line 60, "beds" should read --beads--.

Column 14, line 32, "loads" should read --leads--.

Signed and sealed this 20th day of August 1974.

(SEAL)
Attest:

McCOY M. GIBSON, JR.
Attesting Officer

C. MARSHALL DANN
Commissioner of Patents